(No Model.)
J. I. SARE.
VETERINARY OBSTETRICAL INSTRUMENT.
No. 590,024. Patented Sept. 14, 1897.
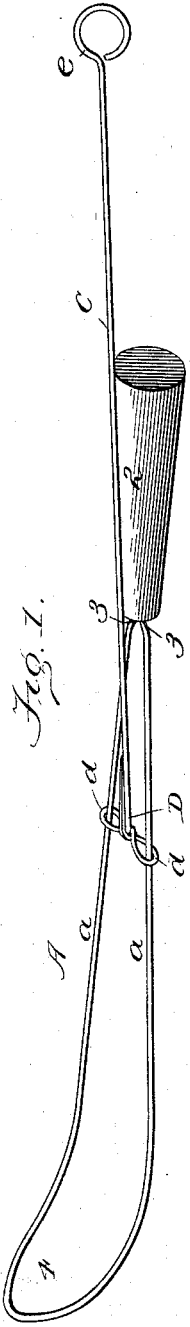
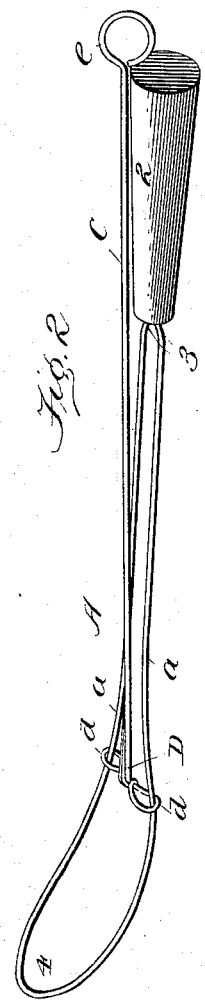
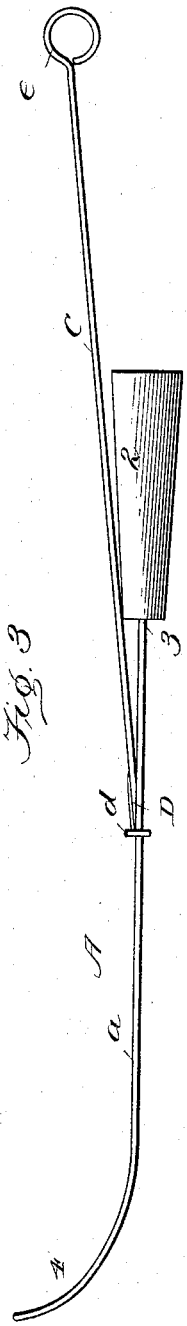
WITNESSES:
Edwin L. Bradford
Ralph Wormelle
INVENTOR
John I. Sare
BY
R.S. & A.P. Lacy.
ATTORNEY.

UNITED STATES PATENT OFFICE.

JOHN IRA SARE, OF NARKA, KANSAS.

VETERINARY OBSTETRICAL INSTRUMENT.

SPECIFICATION forming part of Letters Patent No. 590,024, dated September 14, 1897.

Application filed October 19, 1896. Serial No. 609,351. (No model.)

*To all whom it may concern:*

Be it known that I, JOHN IRA SARE, of Narka, in the county of Republic and State of Kansas, have invented certain new and useful Improvements in Obstetric Devices; and I do hereby declare the following to be a full, clear, and exact description of the invention, such as will enable others skilled in the art to which it appertains to make and use the same.

My invention relates to certain improvements in instruments for aiding animals in giving birth; and the object is to provide a device which is at once simple and inexpensive in construction and easy of adjustment; and to this end the novelty consists in the construction, combination, and arrangement of the same, as will be hereinafter more fully described, and particularly pointed out in the claim.

In the accompanying drawings, which form a part of this application, Figure 1 is a perspective view of an extricator embodying my invention with the loop expanded. Fig. 2 is a side view showing the loop contracted. Fig. 3 is a side elevation of the device as shown in Fig. 1.

A represents the spoon-shaped loop, formed of a single piece of resilient wire, the converging ends of the said wire brought together and fixed in the smaller end of the conical handle 2.

C represents a wire slide of suitable rigidity, the free end of which is formed with an integral eye $e$, and at its opposite end into a transverse cross-head, comprising the guide-eyes $d\,d$, encompassing the converging arms $a\,a$, and having the free end of the wire, after the cross-head is formed, turned across the intersection of the eyes and brought down parallel with the shank, to which it is permanently fixed by brazing or otherwise. This slide C is adapted to draw the parts $a\,a$ toward each other.

It is readily apparent that by sliding the cross-head away from the loop the latter expands to its full extent, so as to readily encompass the head of the animal. The cross-head is then slid forward by means of the shank to adjust the loop to a suitable size, after which the shank and handle may be grasped in one hand and so manipulated without the possibility of changing the adjustment of the loop.

The construction is extremely simple, and owing to the fact that the shank and the handle may be grasped at the same time and held in adjustment with one hand the operation is rendered at once simple, safe, and convenient.

Having thus fully described my invention, what I claim as new and useful, and desire to secure by Letters Patent of the United States, is—

As an improved article of manufacture, the spoon-shaped wire frame A, formed with the converging longitudinal sides $a\,a$, the parallel ends 3 3 which are secured in the smaller end of the longitudinal conical handle 2, in combination with a wire slide, C, adapted to draw the parts $a\,a$ toward each other, the free end thereof formed with an integral eye, $e$, and at its opposite end with a transverse cross-head, comprising the guide-eyes, $d\,d$, encompassing the converging arms, $a\,a$, of the frame A, and having the free end of the wire after the cross-head is formed, turned backward parallel with and secured to the shank, substantially as shown and described.

In testimony whereof I affix my signature in the presence of two witnesses.

JOHN IRA SARE.

Witnesses:
J. F. SARE,
J. H. MALLORY.